Feb. 13, 1951     K. WAGNER     2,541,797
AUDIO-FREQUENCY BAND FILTER
WITH ADJUSTABLE BAND WIDTH
Filed Oct. 6, 1948
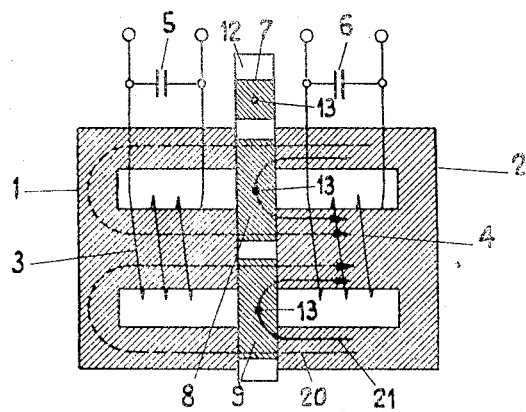
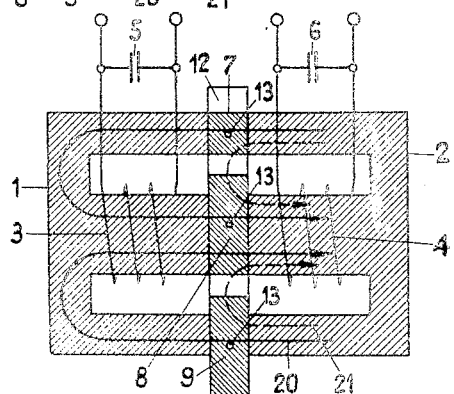
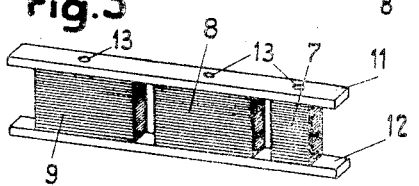
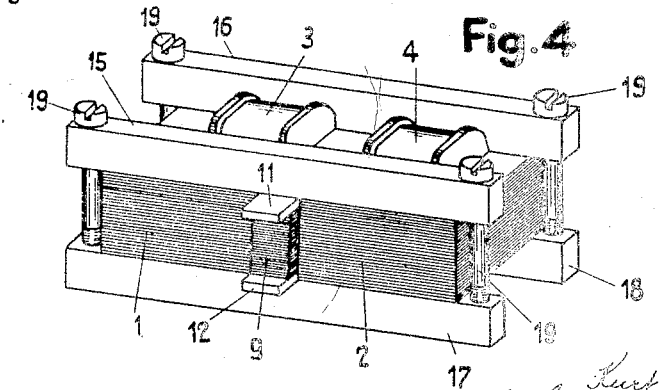

Patented Feb. 13, 1951

2,541,797

UNITED STATES PATENT OFFICE 2,541,797

AUDIO-FREQUENCY BAND FILTER WITH ADJUSTABLE BAND WIDTH

Kurt Wagner, Zurich, Switzerland, assignor to Daphne Investment Trust, Vaduz, Liechtenstein Application October 16, 1948, Serial No. 54,893
In Switzerland August 20, 1948

1 Claim. (Cl. 171—777)

In the field of high frequency technique band filters have long been known which, consisting essentially of two tuned circuits, are used as coupling elements between two steps particularly in the building of receivers. The special characteristic of these filters is that there are always two tuned circuits present, each circuit consisting of inductance and capacitance, and that in the great majority of cases the inductances are magnetically coupled together, this being effected most simply by arranging the relative coils at short intervals.

As has also long been known, it is possible to influence the band width of the filter within certain limits by modifying the coupling, i. e. by modifying the interval in the above mentioned case.

In certain special fields of low frequency technique band filters are also required which in most cases are built up with fixed, invariable coils and condensers, and which are thus determined by calculation as regards their electrical properties and cannot afterwards be easily modified. The present invention relates to an audio-frequency band filter which, in similar fashion to the design which has proved successful with high-frequency band filters, enables the magnetic coupling between the two tuned circuits to be continuously modified by simple means, and thus renders the band width of the filter adjustable. For audio-frequency it is necessary in this case that the lines of magnetic force flow as far as possible in iron. In order to secure, as far as possible, a closed iron path, the present filter consists essentially of two E-shaped punched-out laminated blocks with coils disposed on them, a specially fashioned core being displaceably arranged between said laminated blocks, by the displacement of which core the magnetic coupling and consequently the band width of the filter is modified in the manner more fully described below.

The following figures are intended for the purpose of illustration:

Figs. 1 and 2 show a diagrammatic representation of the two extreme positions which the displaceable core may occupy.

Fig. 3 shows the construction of the displaceable core.

Fig. 4. is a diagrammatic representation of a complete filter.

In the drawings the numbers 1 and 2 designate laminated blocks punched out in E-form with coils 3 and 4 disposed thereon; said coils together with the condensers 5 and 6 form the two oscillating circuits. 7, 8 and 9 designate punched-out laminated blocks which are arranged in parallel spaced relation between two spaced parallel transverse bars 11 and 12 and connected by means of bolts 13 so as to form a rigid core assembly. The parts 7 to 13 form the core which is displaceably disposed between the two laminated blocks 1 and 2. The four clamping bars 15–18 and the four screws 19 secure the entire system together (Fig. 4).

The arrangement described functions as follows: If one of the two oscillating circuits i. e. that in Fig. 1 consisting of coil 4 and condenser 6, is supplied with an alternating current, lines of magnetic force are produced in the known manner in the core 2. These lines of force leave the forward pole ends and are now directed through the displaceable core. This can be seen from Figs. 1 and 2, the former showing the position of the displaceable core, which corresponds to a very weak magnetic coupling.

As the arrows 20 and 21 show, almost all lines of force generated in the core extend through the two core sections 8 and 9; only a small part extends through core 1. Fig. 2 shows the displaceable core adjusted in such a way that the majority of the lines of force extend through core 1, thus ensuring a strong magnetic coupling. Any degree of coupling can be adjusted between these two extreme positions by loosening the screws 19, adjusting the core 7 to 13 and then tightening the screws 19 again.

The magnetically active parts of the core can be made partly or entirely of iron dust.

What I claim as my invention and desire to secure by Letters Patent is:

In an audio-frequency band filter of adjustable band width, two rigid laminated blocks of E-form arranged with their arms in opposite and alined position, coils arranged on said blocks, a rigid core assembly consisting of three magnetic core members arranged in a single row in spaced relation between two parallel bars, said core assembly being displaceably arranged between said laminated blocks in such a manner that opposed sides of said core assembly are in engagement with the opposed end faces of the arms of said E-form blocks, and means for clamping said laminated blocks and said core assembly together in their adjusted position.

KURT WAGNER.

REFERENCES CITED

The following references are of record in the file of this patent:

UNITED STATES PATENTS

| Number | Name | Date |
|---|---|---|
| 2,118,040 | Durkee et al. | May 24, 1938 |

FOREIGN PATENTS

| Number | Country | Date |
|---|---|---|
| 352,795 | Great Britain | July 16, 1931 |